No. 688,979. Patented Dec. 17, 1901.
C. P. WOLD.
BICYCLE DRIVING MECHANISM.
(Application filed May 9, 1901.)
(No Model.) 2 Sheets—Sheet 1.
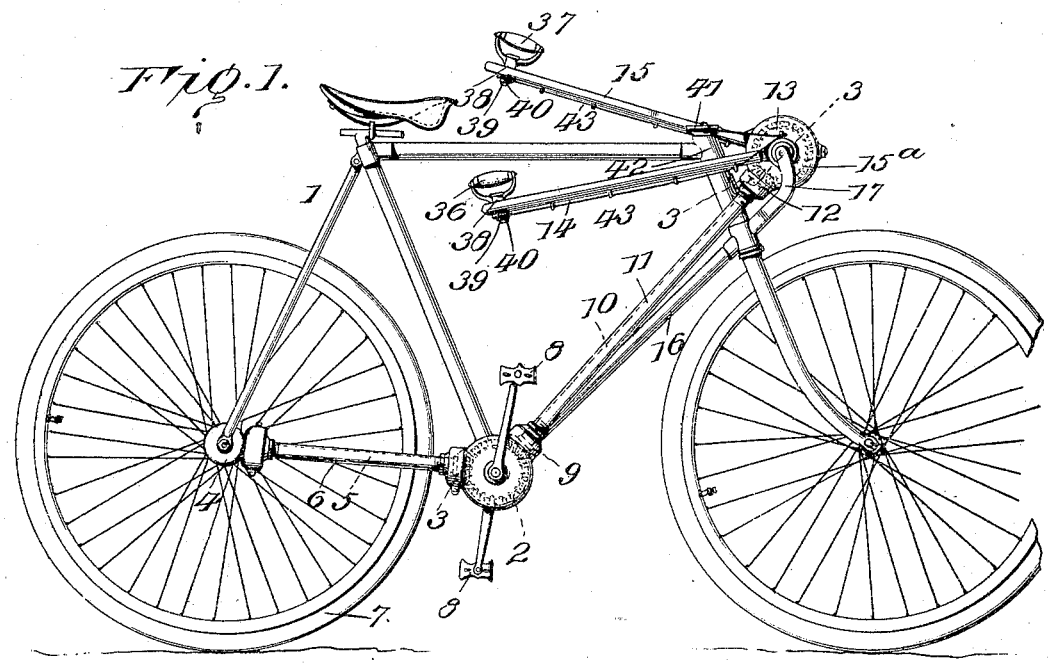
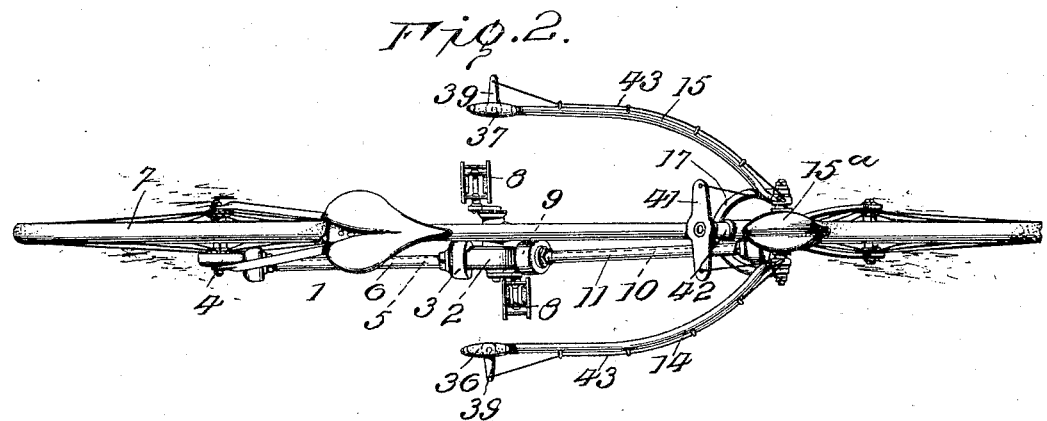
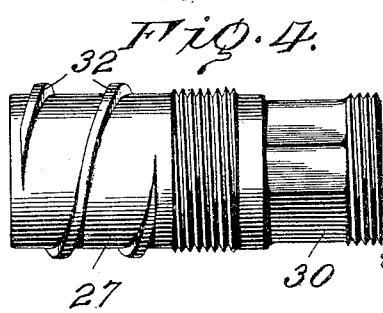
Witnesses
Inventor
Charles P. Wold,
Edw. S. Duvall, Jr.
Attorney No. 688,979. Patented Dec. 17, 1901.
C. P. WOLD.
BICYCLE DRIVING MECHANISM.
(Application filed May 9, 1901.)
(No Model.) 2 Sheets—Sheet 2.
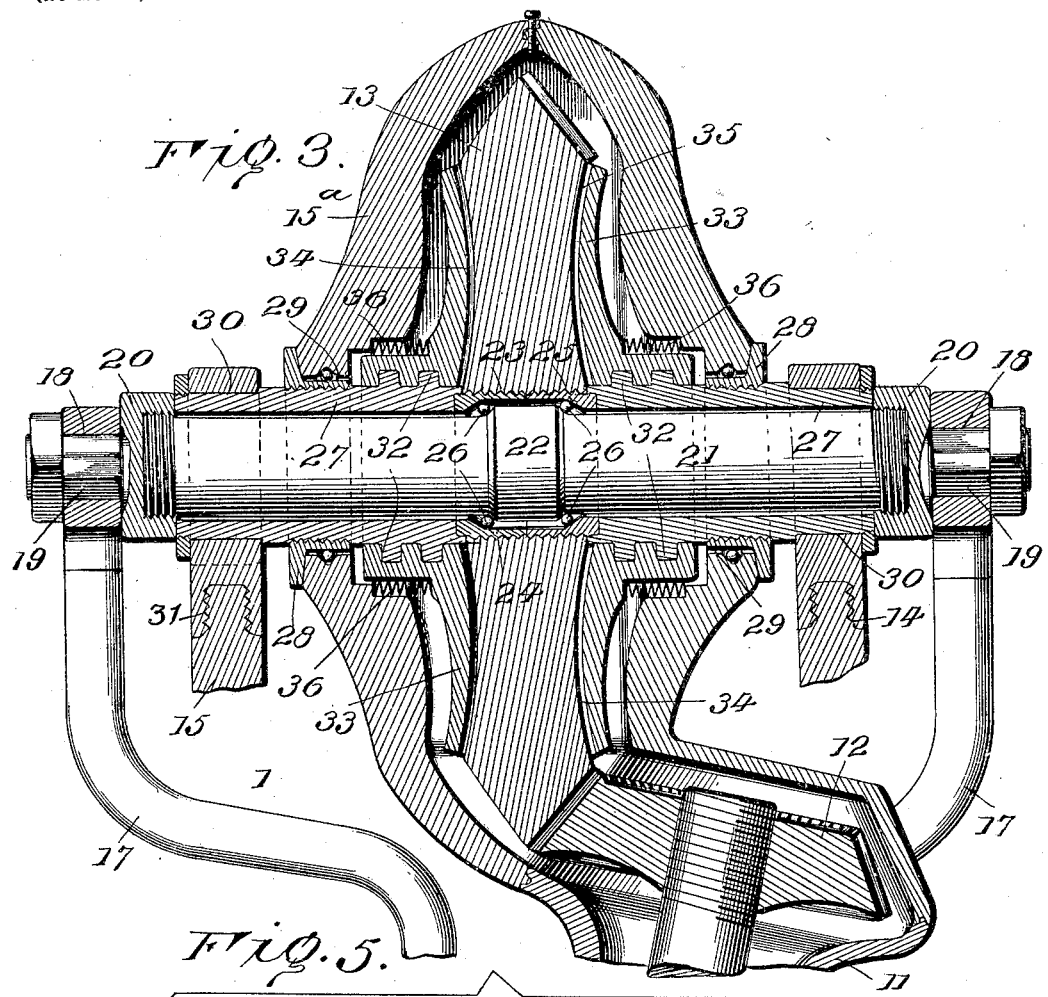
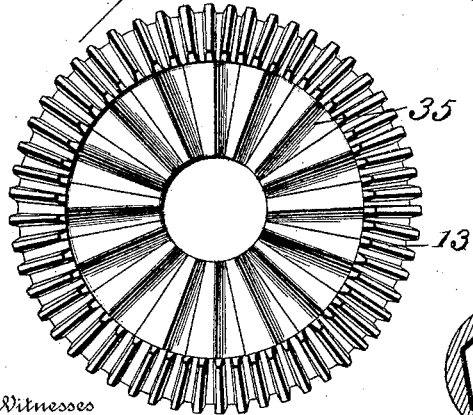
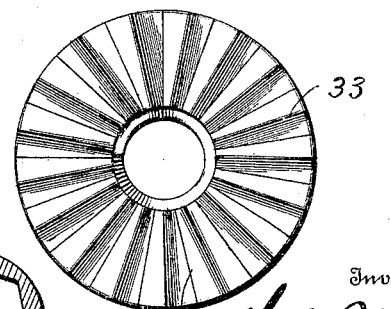
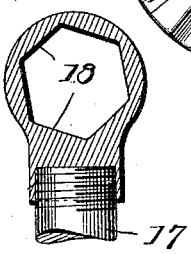
Witnesses
Inventor
Charles P. Wold.
By Edw. S. Duvall, Jr.
Attorney

UNITED STATES PATENT OFFICE.

CHARLES PETERSEN WOLD, OF BROOKLYN, NEW YORK.

BICYCLE DRIVING MECHANISM.

SPECIFICATION forming part of Letters Patent No. 688,979, dated December 17, 1901.

Application filed May 9, 1901. Serial No. 59,490. (No model.)

*To all whom it may concern:*

Be it known that I, CHARLES PETERSEN WOLD, a citizen of the United States, residing at Brooklyn, in the county of Kings and State of New York, have invented certain new and useful Improvements in Bicycle Driving Mechanism, of which the following is a specification.

My invention relates to improvements in foot-power vehicles, and particularly to bicycles.

The objects are to utilize the sway of the body when traveling at an ordinary rate of speed and to bring the muscles of the arms and body into play to assist the limbs when speeding.

The invention therefore consists of driving mechanism under the control of the hands operating upon the main or foot driving-gear in addition to the foot driving mechanism ordinarily employed in bicycles of the type now commonly used.

Other objects and advantages of the mechanism employed will become apparent from the description to follow.

In the drawings illustrating my invention and forming a part of this specification, Figure 1 is a side elevation of a bicycle constructed according to my invention. Fig. 2 is a top plan view of the same. Fig. 3 is an enlarged sectional view on the line 3 3 of Fig. 1. Figs. 4, 5, and 6 are detail views of parts of the hand propelling mechanism.

Like numerals of reference designate like parts throughout the several figures of the drawings.

In carrying out my invention I employ a bicycle 1, which may be of the type known as the "chainless," although it should be understood that my invention may be applied to three or four wheel vehicles propelled by foot-power or to bicycles employing a sprocket and chain. The bicycle illustrated in the drawings has the main driving-gear 2 and driven gears 3 and 4 on the driven shaft 5, all incased in a shell 6 and conveying the power to the rear wheel 7 through the medium of a gear secured thereto. The construction thus described is that commonly employed in bicycles of this type and is operated by the pedals 8.

In order to utilize the sway of the body and the muscles of the arms and body to assist the limbs in propelling the bicycle in running at an ordinary rate, speeding, or hill-climbing, I employ a second gear 9, similar to gear 3, said second gear meshing with the main driving-gear 2. This gear 9 is operated by the shaft 10, which extends through a shell 11 to a point above the front wheel of the bicycle and in front of the frame thereof. Upon the forward end of this shaft 10 is a gear 12 of the type already described, and this meshes with a large gear 13, which I will call the "secondary" driving-gear. This is operated by the vertically-movable handle-bars 14 and 15, which extend back within reach of the rider. This gearing is incased in a shell 15ª and is arranged to revolve the gear 2 in a forward direction.

To provide a support for the gear 13, a fork 17, with branches bent upward at an angle, is secured to the frame at the front of the bicycle in a position to support the shaft of the gear in a horizontal plane. In the ends of said fork are rectilinear openings 18, and in each of these openings is secured by nut the trunnion 19 of a cupped bearing 20. These bearings are in alinement one with the other and are internally threaded to receive the threaded ends of a transverse stationary shaft 21, upon which the revoluble gear 13 is mounted. At the center the shaft 21 is provided with an enlargement 22, of less width than the thickness of the gear, and threaded into a central opening 23 of the gear from opposite sides thereof are the ball-cups 24 and 25, of larger diameter than the enlargement upon the shaft. Between the cups and the shaft and bearing against the enlargement are the balls 26, providing a ball-bearing for the gear 13.

On the shaft and between the ball-cups and the cupped bearings 20 are revolubly mounted the two sleeves 27 27. These sleeves are exteriorly threaded at their central portions to receive interiorly-threaded ball-retaining collars 28, which fit into oppositely-alined openings 29 in the shell 15ª and form ball-bearings for the sleeves 27. That portion of each sleeve which projects outside of the shell is reduced, as at 30, and provided with plane faces. Upon these are fitted the ends of the handle-bars 14 and 15, which may be in sections and provided with the screwthreaded joint 31 to facilitate removal of the bars without disturbing the arrangement of the gear 13 and its parts.

That portion of each sleeve which is located inside of the shell and contiguous to the gear is provided with a coarse quick thread 32. The threads of the two sleeves are opposites—that is to say, they are right-hand on one and left-hand on the other—and threaded thereon are the two disks 33 33. These disks are normally in close proximity to the side faces of the gear 13, and the opposing faces of the gear and disks are provided with radial teeth 34 and 35, which are intended to interlock when the disks are forced against the gear by the action of the threads 32, when the sleeves 27 are revolved by the uplifting of the handle-bars 14 and 15. After the disks come into contact with the gear and the teeth interlock the further movement of the handles and rotation of the sleeves causes the gear to rotate in a forward direction, and this causes the rotation of the gears 12 and 9 and finally the forward rotation of the driving-gear 2. Springs 36 may be employed between the shell and the disks 33 to make the movement of the disks against the gear more positive. It will be seen by reference to the drawings, Fig. 3, that the shell for this gearing is in sections to facilitate the assembling of the parts.

The handle-bars 14 and 15 are so curved in plan that the knees of the rider will not come into contact therewith, and at the ends of the bars are the handles or grasps 36 and 37, vertically journaled therein. The handles are provided with spindles or posts 38, which pass vertically through the bars. The ends, which are squared, project below the said bars, and secured thereon by nuts 40 are arms 39 39. The ends of these arms are connected to a tiller-head 41, carried by the steering-post 42 by means of cords or chains 43, passing along the handle-bars to the front ends, where they pass around pulleys or other devices of an antifriction nature and double back to the steering-head. It will be seen that a movement of the wrist of the right hand or of the left will guide the wheel in the desired direction.

This completes the description of my invention, and from the same it will be seen that I have devised a simple and useful improvement in bicycles and one which will insure ease and grace in riding, as well as to materially increase the power.

Having thus described my invention, what I claim as new, and desire to secure by Letters Patent of the United States, is—

1. In a vehicle, the combination with a main driving-gear and connections for transmitting motion from the said driving-gear to the wheels of the vehicle, of a steering-post tube, a fork attached thereto, and a stationary shaft mounted in said fork, a secondary driving-gear mounted on said shaft to rotate, means for transmitting motion from said secondary driving-gear to the main driving-gear, independently-acting, revoluble, tubular shafts incasing the stationary shaft, on each side of the secondary gear, clutching-disks mounted upon said tubular shafts, contiguous to the opposite faces of the secondary gear, means for moving said disks longitudinally upon the tubular shafts and into engagement with the faces of the secondary gear, upon the rocking of the said tubular shafts, and vertically-movable handle-bars attached to said shafts and adapted to rock the same and thereby to continuously rotate the secondary driving-gear, substantially as described.

2. In a vehicle, the combination with a main driving-gear and connections for transmitting motion from the same to the wheels of the vehicle, of a rotatable, secondary, driving-gear, means for transmitting motion from said secondary driving-gear to the main driving-gear, rotatable clutching-disks mounted contiguous to the opposite faces of the secondary driving-gear, and constructed to engage with the said secondary driving-gear, vertically-movable handle-bars acting alternately and designed to throw the disks alternately into engagement with the said secondary driving-gear, and continuously rotate the same, and movable handles or grasps on said handle-bars, with means for operating the steering-wheel of the vehicle through the movement of the said movable handles.

3. In a vehicle, the combination with a main driving-gear and connections for transmitting motion from the same to the wheels of the vehicle, of a rotatable, secondary driving-gear, a rotatable shaft with pinions at each end engaging respectively with the main and secondary driving-gears, rotatable disks mounted contiguous to the opposite faces of the secondary driving-gear, the opposite faces of the gear and the contiguous faces of the disks being formed with radial teeth or serrations, vertically-movable handle-bars, acting alternately and constructed to throw the disks alternately into engagement with the said secondary driving-gear, and continuously rotate the same, with means for steering the vehicle.

In testimony whereof I affix my signature in presence of two witnesses.

CHARLES PETERSEN WOLD.

Witnesses:
  OLUFF LARSEN,
  EDWARD FRANDIG.